US010657980B2

(12) United States Patent
Dimitriadis et al.

(10) Patent No.: US 10,657,980 B2

(45) **Date of Patent: *May 19, 2020**

(54) DENOISING A SIGNAL

(71) Applicant: International Business Machines Corporation, Armonk, NY (US)

(72) Inventors: Dimitrios B. Dimitriadis, White Plains, NY (US); Samuel Thomas, Elmsford, NY (US); Colin C. Vaz, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/793,884

(22) Filed: Oct. 25, 2017

(65) Prior Publication Data

US 2018/0047409 A1 Feb. 15, 2018

Related U.S. Application Data

(63) Continuation of application No. 15/222,807, filed on Jul. 28, 2016.

(60) Provisional application No. 62/310,588, filed on Mar. 18, 2016.

(51) Int. Cl.
*G10L 15/00* (2013.01)
*G10L 21/0208* (2013.01)
*G10L 15/20* (2006.01)

(52) U.S. Cl.
CPC .................... *G10L 21/0208* (2013.01)

(58) Field of Classification Search
CPC ............ G10L 21/0208; G10L 21/0205; G10L 21/02161; G10L 21/0224
USPC .................................................... 704/223
See application file for complete search history.

(56) References Cited

U.S. PATENT DOCUMENTS

| | | | |
|---|---|---|---|
| 10,347,270 | B2 | 7/2019 | Dimitriadis et al. |
| 2015/0112670 | A1 | 4/2015 | Le Roux et al. |
| 2016/0341814 | A1 | 11/2016 | Nguyen et al. |
| 2017/0213321 | A1 | 7/2017 | Matviychuk et al. |
| 2017/0270945 | A1 | 9/2017 | Dimitriadis et al. |
| 2019/0237090 | A1 | 8/2019 | Dimitriadis et al. |

OTHER PUBLICATIONS

Lee et al., "Towards Detecting Emotion in Spoken Dialogs," IEEE Transactions on Speech and Audio Process, vol. 13, No. 2, Mar. 2005, pp. 293-302.

Yin et al., "Speech-Based Cognitive Load Monitoring System," Proceedings of International Conference Acoustics, Speech, and Signal Process, 2008, pp. 2041-2044.

Macho et al., "Evaluation of a Noise-Robust DSR Front-End on Aurora Databases," Proceedings International Conference on Spoken Language Processing, Sep. 16-20, 2002, pp. 17-20.

(Continued)

*Primary Examiner* — Thierry L Pham

(74) *Attorney, Agent, or Firm* — Zilka-Kotab, P.C.

(57) ABSTRACT

A computer-implemented method according to one embodiment includes creating a clean dictionary, utilizing a clean signal, creating a noisy dictionary, utilizing a first noisy signal, determining a time varying projection, utilizing the clean dictionary and the noisy dictionary, and denoising a second noisy signal, utilizing the time varying projection.

11 Claims, 6 Drawing Sheets

(56) References Cited

OTHER PUBLICATIONS

Yoshioka et al., "Noise Model Transfer: Novel Approach to Robustness Against Nonstationary Noise," IEEE Trans. Acoustics, Speech, and Lang. Process., vol. 21, No. 10, Oct. 2013, pp. 2182-2192.
Droppo et al., "Evaluation of the Splice Algorithm on the Aurora2 Database," Proc. Eurospeech, 2001, pp. 217-220.
Kalinli et al., "Noise Adaptive Training for Robust Automatic Speech Recognition," IEEE Trans. Acoustics, Speech, and Lang. Process., vol. 18, No. 8, Nov. 2010, pp. 1889-1901.
Wang et al., "Speaker and Noise Factorization for Robust Speech Recognition," IEEE Trans. Acoustics, Speech, and Lang. Process., vol. 20, No. 7, Sep. 2012, pp. 2149-2158.
Seltzer et al., "An Investigation of Deep Neural Networks for Noise Robust Speech Recognition," Proc. Int. Conf. Acoustics, Speech, and Signal Process, IEEE, 2013, pp. 7398-7402.
Boll, S., "Suppression of Acoustic Noise in Speech Using Spectral Subtraction," IEEE Trans. Acoustics, Speech, and Signal Process., vol. 20, No. 2, Apr. 1979, pp. 113-120.
Paatero et al., "Positive Matrix Factorization: A Non-Negative Factor Model with Optimal Utilization of Error Estimates of Data Values," Environmetrics, vol. 5, No. 2, 1994, pp. 111-126.
Lee et al., "Algorithms for Non-Negative Matrix Factorization," Adv. in Neu. Info. Proc. Sys., vol. 13, 2001, pp. 556-562.
Narayanan et al, "Investigation of Speech Separation as a Front-End for Noise Robust Speech Recognition," IEEE/ACM Trans. Audio, Speech, and Lang. Process., vol. 22, No. 4, 2014, pp. 826-835.
Moreno et al., "A Vector Taylor Series Approach for Environment-Independent Speech Recognition," Proc. Int. Conf. Acoustics, Speech, and Signal Process IEEE, 1996, vol. 2, pp. 733-736.
Deng et al., "High-Performance Robust Speech Recognition Using Stereo Training Data," Proc. Int. Conf. Acoustics, Speech, and Signal Process. IEEE, 2001, pp. 301-304.
Kim et al., "Power-Normalized Cepstral Coefficients (PNCC) for Robust Speech Recognition," Proc. Int. Conf. Acoustics, Speech, and Signal Process. IEEE, 2012, pp. 4101-4104.
Smaragdis, P., "Convolutive Speech Bases and Their Application to Supervised Speech Separation," IEEE Trans. Acoustics, Speech, and Lang. Process, vol. 15, No. 1, Jan. 2007, pp. 1-12.
Hoyer, P., "Non-Negative Matrix Factorization with Sparseness Constraints," Journal Machine Learning Research, vol. 5, Dec. 2004, pp. 1457-1469.
O'Grady et al., "Discovering Speech Phones Using Convolutive Non-Negative Matrix Factorisation with a Sparseness Constraint," Neurocomputing, vol. 72, No. 1-3, Dec. 2008, pp. 88-101.
Dehak et al., "Front-End Factor Analysis for Speaker Verification," IEEE/ACM Trans. Acoustics, Speech, and Lang. Process., vol. 19, No. 4, May 2011, pp. 788-798.
Parihar et al., "Analysis of the Aurora Large Vocabulary Evaluations," Proc. Eurospeech, 2003, pp. 337-340.
Soltau et al., "The IBM Attila Speech Recognition Toolkit," Proc. IEEE Workshop Spoken Lang. Technology, Dec. 2010, pp. 97-102.
Griffin et al., "Signal Estimation From Modified Short-Time Fourier Transform," IEEE Trans. Acoustics, Speech, and Signal Process., vol. 32, No. 2, Apr. 1984, pp. 236-243.
Narayanan et al., "Improving Robustness of Deep Neural Network Acoustic Models via Speech Separation and Joint Adaptive Training," IEEE/ACM Trans. Acoustics, Speech, and Lang. Process., vol. 23, No. 1, Jan. 2015, pp. 92-101.
Paatero, P., "Least squares formulation of robust non-negative factor analysis," Chemometrics and Intelligent Laboratory Systems, vol. 37, 1997, pp. 23-35.
Dimitriadis et al., U.S. Appl. No. 15/222,807, filed Jul. 28, 2016.
List of IBM Patents or Patent Applications Treated as Related.
Non-Final Office Action from U.S. Appl. No. 15/222,807, dated Sep. 13, 2018.
Notice of Allowance from U.S. Appl. No. 15/222,807, dated Feb. 19, 2019.
Dimitriadis et al., U.S. Appl. No. 16/379,667, filed Apr. 9, 2019.
Notice of Allowance from U.S. Appl. No. 16/379,667, dated Dec. 17, 2019.
Dimitriadis et al., U.S. Appl. No. 16/799,623, filed Feb. 24, 2020.

DENOISING A SIGNAL

BACKGROUND

The present invention relates to audio analysis, and more specifically, this invention relates to denoising an input signal.

The existence of noise within a signal may be problematic when performing one or more actions utilizing the signal. For example, automatic speech recognition (ASR) is a popular way of interfacing humans and devices, but ASR systems may perform poorly in noisy environments. Generally, features extracted from noisy speech contain distortion and artifacts, degrading the ASR performance. There is therefore a need to enhance input noisy signals and to extract noise-robust features from the signals.

SUMMARY

A computer-implemented method according to one embodiment includes creating a clean dictionary, utilizing a clean signal, creating a noisy dictionary, utilizing a first noisy signal, determining a time varying projection, utilizing the clean dictionary and the noisy dictionary, and denoising a second noisy signal, utilizing the time varying projection.

Other aspects and embodiments of the present invention will become apparent from the following detailed description, which, when taken in conjunction with the drawings, illustrate by way of example the principles of the invention.

DETAILED DESCRIPTION

Figure 1:
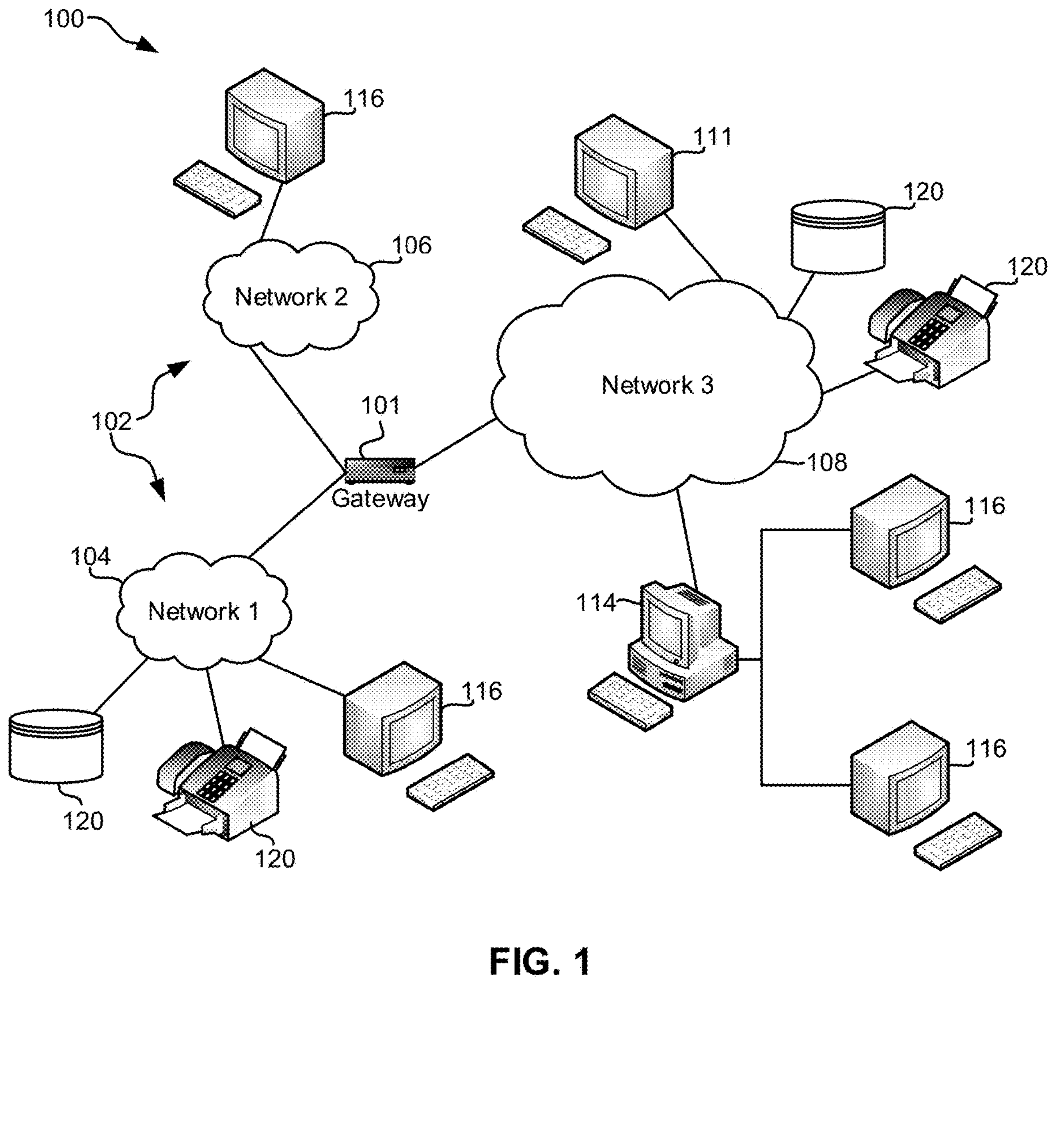
FIG. 1 illustrates a network architecture, in accordance with one embodiment.

The following description discloses several preferred embodiments of systems, methods and computer program products for denoising a signal. Various embodiments provide a method to analyze both noisy and clean signals and apply the analysis to denoise additional noisy signals.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for denoising a signal.

In one general embodiment, a computer-implemented method includes creating a clean dictionary, utilizing a clean signal, creating a noisy dictionary, utilizing a first noisy signal, determining a time varying projection, utilizing the clean dictionary and the noisy dictionary, and denoising a second noisy signal, utilizing the time varying projection In another general embodiment, a computer program product for denoising a signal comprises a computer readable storage medium having program instructions embodied therewith, wherein the computer readable storage medium is not a transitory signal per se, and where the program instructions are executable by a processor to cause the processor to perform a method comprising creating, utilizing a processor, a clean dictionary, utilizing a clean signal, creating, utilizing the processor, a noisy dictionary, utilizing a first noisy signal, determining, utilizing the processor, a time varying projection, utilizing the clean dictionary and the noisy dictionary, and denoising, utilizing the processor, a second noisy signal, utilizing the time varying projection.

In another general embodiment, a system includes a processor and logic integrated with and/or executable by the processor, the logic being configured to create a clean dictionary, utilizing a clean signal, create a noisy dictionary, utilizing a first noisy signal, determine a time varying projection, utilizing the clean dictionary and the noisy dictionary, and denoise a second noisy signal, utilizing the time varying projection.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
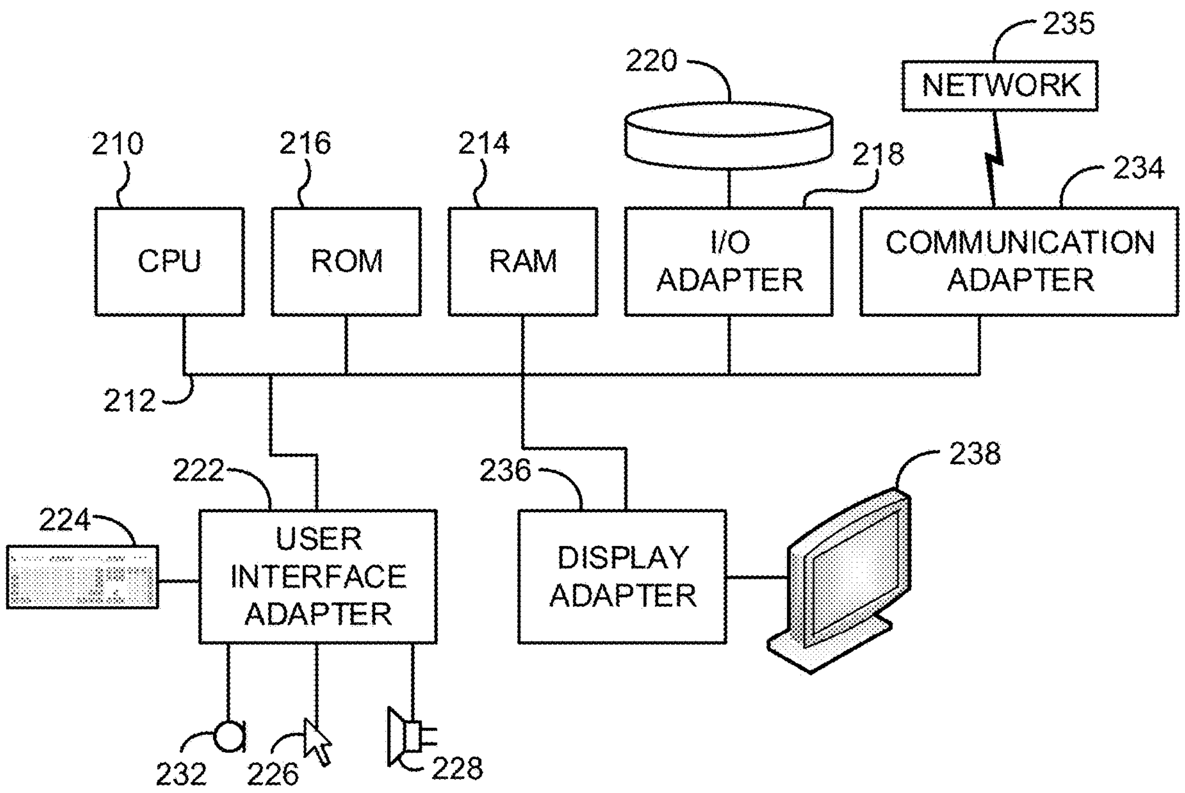
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
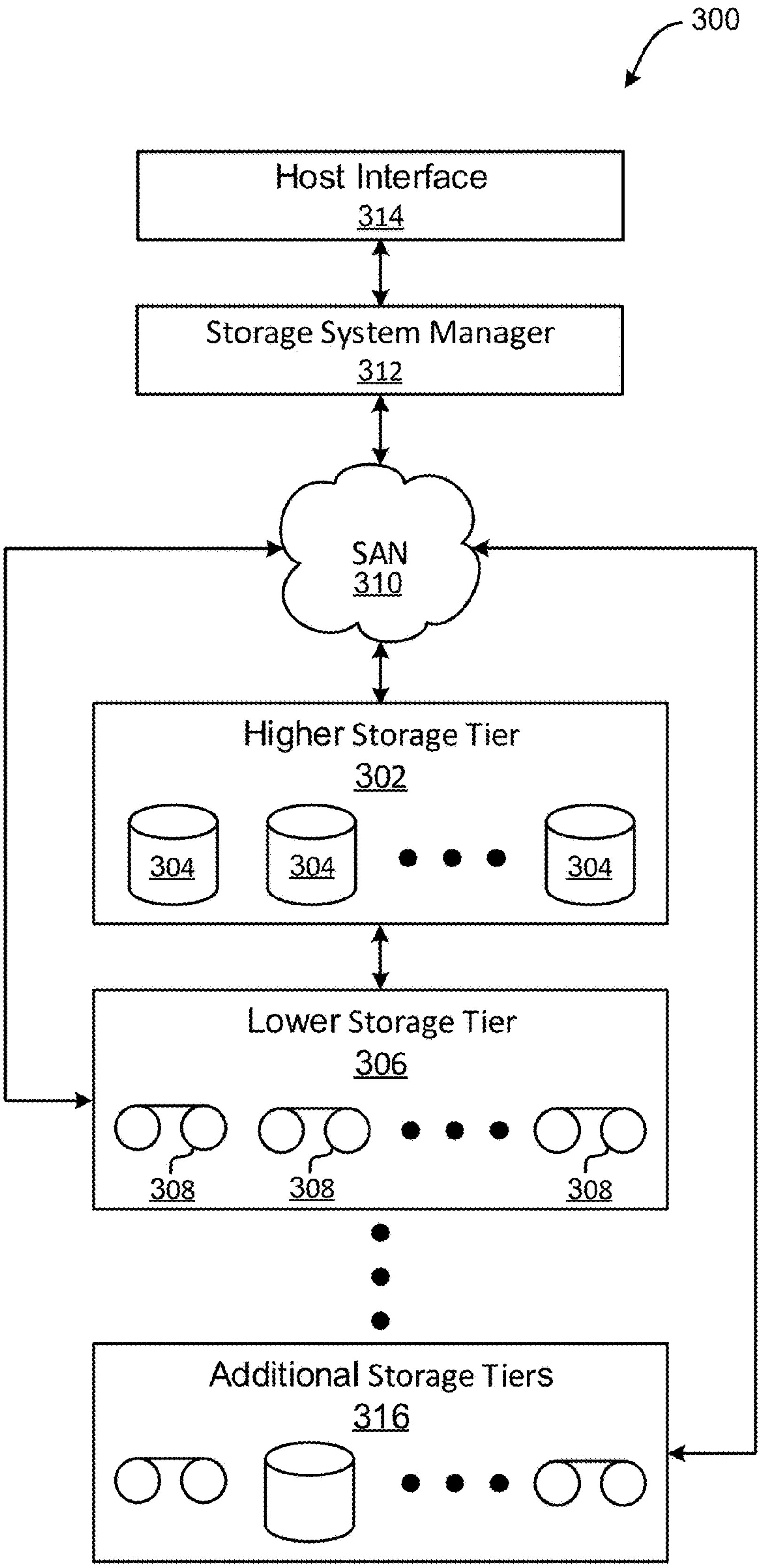
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
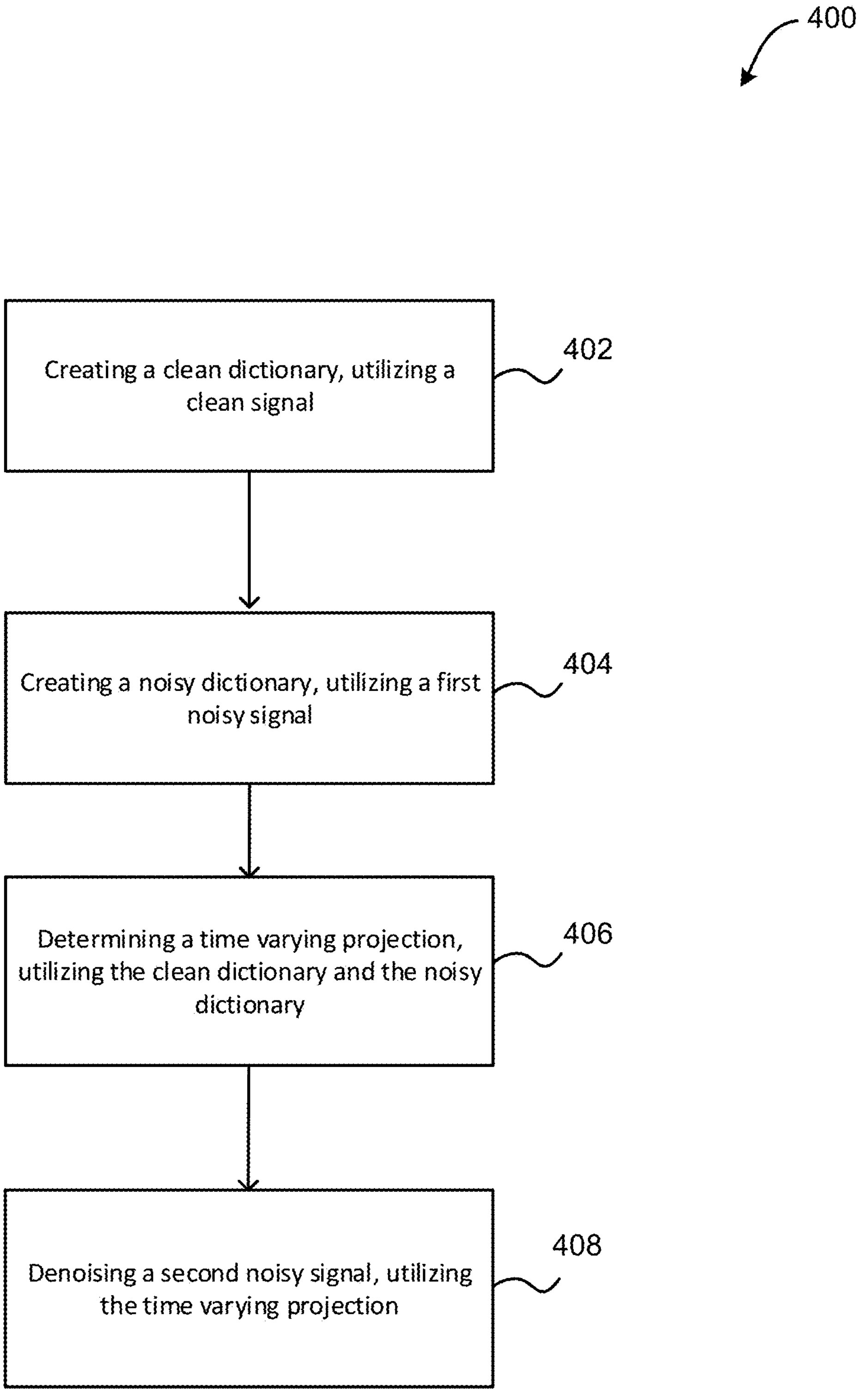
FIG. 4 illustrates a method for denoising a signal, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a clean dictionary is created, utilizing a clean signal. In one embodiment, the clean signal may include an identified audio signal. For example, the clean signal may include a clean speech audio signal in which one or more individuals are talking. In another embodiment, the clean signal may include one or more utterances (e.g., verbal utterances by one or more individuals, one or more audio recordings, etc.). In yet another embodiment, the clean signal may include speech that is recorded without additional noise present. For example, the clean signal may include a recording of verbal speech that only contains the speech itself and does not contain any background noise. In still another embodiment, the clean signal may include a temporal component.

Additionally, in one embodiment, creating the clean dictionary may include creating a clean spectrogram, utilizing the clean signal. For example, the clean signal may be converted into a clean spectrogram that includes a visual representation of the spectrum of frequencies in the clean signal as they vary with time.

Further, in one embodiment, creating the clean dictionary may include converting the clean spectrogram into a plurality of clean spectro-temporal building blocks. For example, a convolutive non-negative matrix factorization (CNMF) algorithm may be applied to the clean spectrogram. In another example, the CNMF may identify the plurality of clean spectro-temporal building blocks within the clean spectrogram. In yet another example, the plurality of clean spectro-temporal building blocks may be created, based on the identification.

Further still, in one embodiment, each of the clean spectro-temporal building blocks may include basic spectral and temporal representations of the clean signal. For example, each of the clean spectro-temporal building blocks may represent a portion of the clean signal. In another embodiment, creating the clean dictionary may include adding the plurality of clean spectro-temporal building blocks to the clean dictionary. In another embodiment, the clean dictionary may be stored in one or more data structures (e.g., one or more databases, networked and/or cloud data storage, etc.).

Further, as shown in FIG. 4, method 400 may proceed with operation 404, where a noisy dictionary is created, utilizing a first noisy signal. In one embodiment, the noisy signal may include another identified audio signal. For example, the noisy signal may include a noisy speech audio signal in which one or more individuals are talking. In another embodiment, the noisy signal may include one or more utterances (e.g., verbal utterances by one or more individuals, one or more audio recordings, etc.).

In yet another embodiment, the noisy signal may include speech that is recorded with additional noise present. For example, the noisy signal may include a recording of verbal speech to which noise (e.g., environmental noise, background noise, static noise, etc.) has been added. In still another embodiment, the noisy signal may include the clean signal to which noise has been added. For example, the clean signal and its noisy version may be paired in a stereo dataset.

In addition, in one embodiment, creating the noisy dictionary may include creating a noisy spectrogram, utilizing the noisy signal. For example, the noisy signal may be converted into a noisy spectrogram that includes a visual representation of the spectrum of frequencies in the noisy speech signal as they vary with time.

Furthermore, in one embodiment, creating the noisy dictionary may include converting the noisy spectrogram into a plurality of noisy spectro-temporal building blocks. For example, a convolutive non-negative matrix factorization (CNMF) algorithm may be applied to the noisy spectrogram. In another example, the CNMF may identify the plurality of noisy spectro-temporal building blocks within the noisy spectrogram. In yet another example, the plurality of noisy spectro-temporal building blocks may be created, based on the identification.

In another embodiment, the clean dictionary and the noisy dictionary may be expanded by updating the clean dictionary and the noisy dictionary to include new clean spectro-temporal building blocks and new noisy spectro-temporal building blocks created utilizing additional clean and noisy signals.

Further still, in one embodiment, each of the noisy spectro-temporal building blocks may include basic spectral and temporal representations of the noisy signal. For example, each of the noisy spectro-temporal building blocks may represent a portion of the noisy signal. In another embodiment, creating the noisy dictionary may include adding the plurality of noisy spectro-temporal building blocks to the noisy dictionary. In another embodiment, the noisy dictionary may be stored in one or more data structures (e.g., one or more databases, networked and/or cloud data storage, etc.). In yet another embodiment, the noisy dictionary and the clean dictionary may be stored in the same location (e.g., a single dictionary may contain the noisy dictionary and the clean dictionary). In still another embodiment, the noisy dictionary and the clean dictionary may be stored in different locations.

Further still, as shown in FIG. 4, method 400 may proceed with operation 406, where a time varying projection is determined, utilizing the clean dictionary and the noisy dictionary. In one embodiment, determining the time varying projection may include generating a time activation matrix for the clean signal, utilizing the clean dictionary. For example, the time activation matrix for the clean signal may include the plurality of clean spectro-temporal building blocks stored in the clean dictionary.

Additionally, in one embodiment, the time activation matrix for the clean signal may identify which clean spectro-temporal building block is active at a particular time period. For example, each column of the time activation matrix for the clean signal may indicate which of the clean spectro-temporal building blocks in the clean dictionary is active for a particular time. In another embodiment, the time activation matrix for the clean signal may encode an occurrence and magnitude of each clean spectro-temporal building block within the clean signal.

Further, in one embodiment, determining the time varying projection may include generating a time activation matrix for the noisy signal, utilizing the noisy dictionary. For example, the time activation matrix for the noisy signal may include the plurality of noisy spectro-temporal building blocks stored in the noisy dictionary.

Further still, in one embodiment, the time activation matrix for the noisy signal may identify which noisy spectro-temporal building block is active at a particular time period. For example, each column of the time activation matrix for the noisy signal may indicate which of the noisy spectro-temporal building blocks in the noisy dictionary is active for a particular time. In another embodiment, the time activation matrix for the noisy signal may encode an occurrence and magnitude of each noisy spectro-temporal building block within the noisy signal.

Also, in one embodiment, the time activation matrix for the clean signal and the time activation matrix for the noisy signal may be compared to create the time varying projection. For example, the time activation matrix for the clean signal and the time activation matrix for the noisy signal may be compared in order to compare clean spectro-temporal building blocks and noisy spectro-temporal building blocks for a given time period. In another example, the comparison of the time activation matrix for the clean signal to the time activation matrix for the noisy signal may result in a determination of a time activation matrix that changes noisy spectro-temporal building blocks to get clean spectro-temporal building blocks.

In addition, in one embodiment, the time-varying projection may include a time-varying projection matrix that may denoise noisy time activation matrices (e.g., time activation matrices of the noisy signal, etc.). In another embodiment, the time-varying projection may be trained utilizing the time activation matrix for the clean signal and the time activation matrix for the noisy signal, and may perform denoising by projecting time activation matrices of the noisy signal onto a space containing the time activation matrices of the clean signal. In yet another embodiment, denoising may include removing and/or reducing a presence of noise within a signal.

Also, as shown in FIG. 4, method 400 may proceed with operation 408, where a second noisy signal is denoised, utilizing the time varying projection. In one embodiment, the second noisy signal may be different from the first noisy signal. For example, the second noisy signal may include a new, unknown speech signal that was not created by adding noise to a clean signal. In another example, the second noisy signal may include a signal in which noise naturally occurs. In another embodiment, the second noisy signal may include an audio signal in which one or more individuals are talking. In yet another embodiment, the second noisy signal may include one or more utterances (e.g., verbal utterances by one or more individuals, one or more audio recordings, etc.).

Further still, in one embodiment, denoising the second noisy signal may include creating a second noisy spectrogram, utilizing the second noisy signal. For example, the second noisy signal may be converted into a second noisy spectrogram that includes a visual representation of the spectrum of frequencies in the second noisy signal as they vary with time.

Also, in one embodiment, denoising the second noisy signal may include converting the second noisy spectrogram into a plurality of noisy spectro-temporal building blocks. For example, a convolutive non-negative matrix factorization (CNMF) algorithm may be applied to the second noisy spectrogram. In another example, the CNMF may identify the plurality of noisy spectro-temporal building blocks within the second noisy spectrogram. In yet another example, the plurality of noisy spectro-temporal building blocks may be created, based on the identification.

Additionally, in one embodiment, each of the noisy spectro-temporal building blocks may include basic spectral and temporal representations of the noisy speech for the second noisy signal. For example, each of the noisy spectro-temporal building blocks may represent a portion of the second noisy signal. In another embodiment, creating the second noisy dictionary may include adding the plurality of noisy spectro-temporal building blocks to the second noisy dictionary.

For example, the second noisy dictionary may include a time-varying dictionary that includes each of the noisy spectro-temporal building blocks for the second noisy signal. In another embodiment, the second noisy dictionary may be stored in one or more data structures (e.g., one or more databases, networked and/or cloud data storage, etc.). In yet another embodiment, the second noisy dictionary and the first noisy dictionary may be stored in the same location (e.g., a single dictionary may contain the second noisy dictionary and the first noisy dictionary).

Further, in one embodiment, denoising the second noisy signal may include generating a time activation matrix for the second noisy signal, utilizing the second noisy dictionary. For example, the time activation matrix for the second noisy signal may include the plurality of noisy spectro-temporal building blocks for the second noisy signal that are stored in the second noisy dictionary.

Further still, in one embodiment, the time activation matrix for the second noisy signal may identify which noisy spectro-temporal building block for the second noisy signal is active at a particular time period. For example, each column of the time activation matrix for the second noisy signal may indicate which of the noisy spectro-temporal building blocks in the second noisy dictionary is active for a particular time. In another embodiment, the time activation matrix for the second noisy signal may encode an occurrence and magnitude of each noisy spectro-temporal building block within the second noisy signal.

Also, in one embodiment, denoising the second noisy signal may include applying the time varying projection to the time activation matrix for the second noisy signal to obtain a denoised time activation matrix. For example, the time varying projection may analyze the time activation matrix for the second noisy signal and may create a denoised time activation matrix as a result of the analysis. In another example, the denoised time activation matrix created by the time varying projection may include a plurality of denoised spectro-temporal building blocks that includes the speech of the noisy spectro-temporal building blocks for the second noisy signal without the noise found in the noisy spectro-temporal building blocks for the second noisy signal.

In addition, in one embodiment, the denoised time activation matrix may be sent to a speech recognizer (e.g., an automated speech recognition (ASR) module, etc.). In another embodiment, the speech recognizer may analyze the denoised time activation matrix in order to determine a textual representation of the denoised speech.

Also, in one embodiment, the denoised time activation matrix may be used to provide noise-robust acoustic features for automatic speech recognition (ASR). For example, the denoised time activation matrix may be used in combination with one or more acoustic features, selected from a group consisting of log-mel filterbank engeries and mel-frequency cepstral coefficients (MFCCs), to provide noise-robust acoustic features for ASR. In another embodiment, each signal may include a temporal component, and one or more of the signals may have temporal continuity and context dependency.

In this way, the time varying projection may be used to remove noise from the second noisy signal to create a plurality of unique denoised components. This may decrease error rates caused by noise during automated speech recognition. This technique may extend beyond speech audio signals and may be applied to any domains where there is a strong spectro-temporal correlation in the signal and the signal may be decomposed into spectro-temporal building blocks.

Furthermore, in one embodiment, the denoised spectro-temporal building blocks may be added to a dictionary. For example, the denoised spectro-temporal building blocks may be added to the clean dictionary in order to further train and refine the time-varying projection. In another embodiment, one or more annotations may be included within one or more of the spectro-temporal building blocks. For example, an annotation added to a spectro-temporal building block may increase a confidence level and/or confirm that the spectro-temporal building block corresponds to predetermined sound. This may result in a "discriminative dictionary" that may discriminate clearly between different sounds within a signal.

Figure 5:
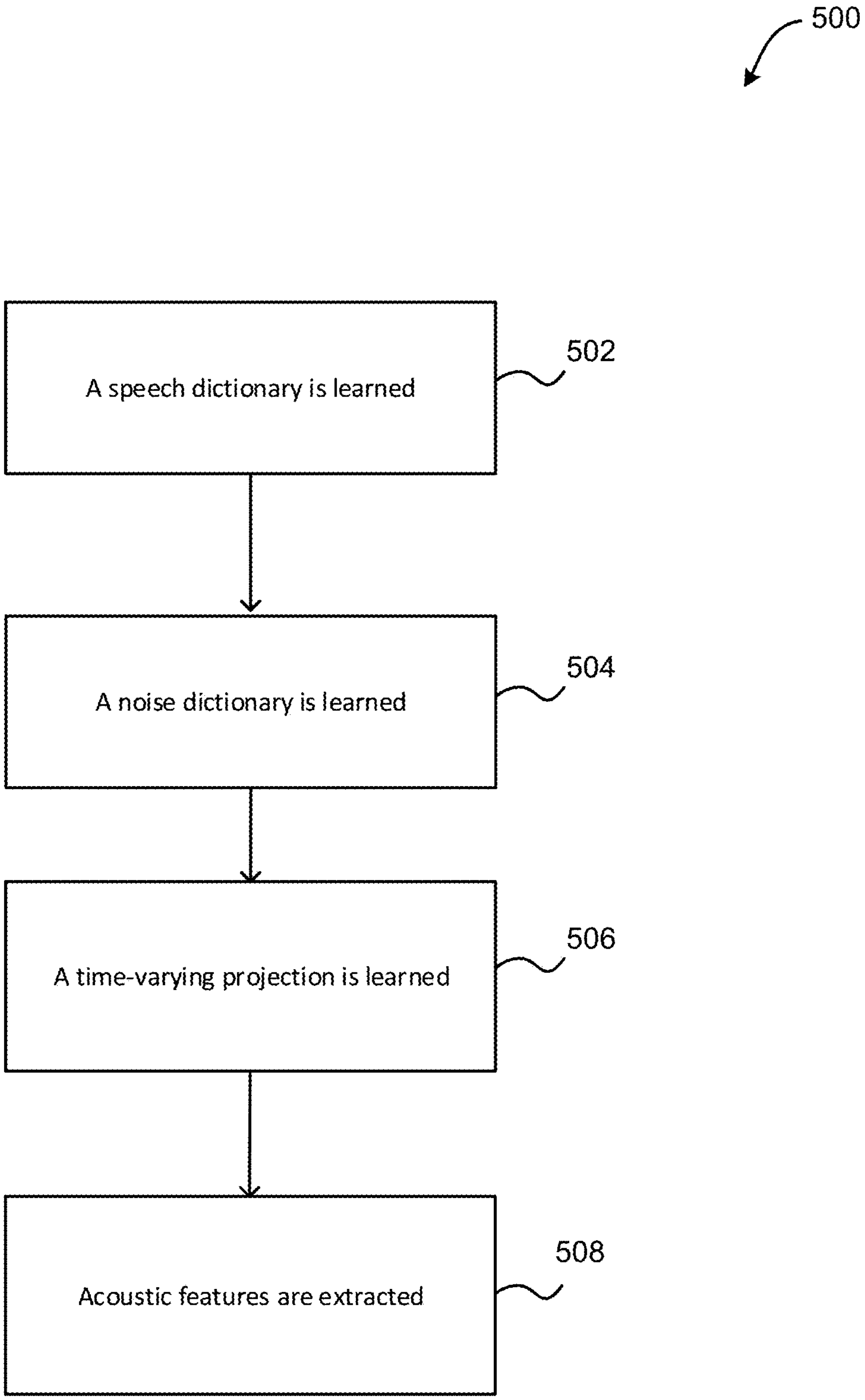
FIG. 5 illustrates a method for creating noise-robust acoustic features, in accordance with one embodiment.

Now referring to FIG. 5, a flowchart of a method 500 for creating noise-robust acoustic features is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a speech dictionary is learned. In one embodiment, speech may contain certain spectro-temporal properties that help distinguish it from background noise. In another embodiment, CNMF may include an algorithm that discovers the spectro-temporal building blocks of speech and stores the building blocks in a time-varying dictionary. For example, CNMF may decompose a spectrogram $V \in \mathbb{R}_+^{m \times n}$ into a time-varying dictionary $W \in \mathbb{R}_+^{m \times K \times T}$ and time-activation matrix $H \in \mathbb{R}_+^{K \times n}$ by minimizing the divergence between V and $\hat{V} := \Sigma_{t=0}^{T-1} W(t) \overset{t\rightarrow}{H} \cdot W(t)$ refers to the dictionary at time t (the third dimension of W) and $\overset{t\rightarrow}{H}$ means that the columns of H are shifted t columns to the right and t all-zero columns are filled in on the left. In another embodiment, the generalized KL divergence between V and $\hat{V}$ may be minimized.

Table 1 illustrates an exemplary minimization of the generalized KL divergence between V and $\hat{V}$. Of course, it should be noted that the exemplary minimization shown in Table 1 is set forth for illustrative purposes only, and thus should not be construed as limiting in any manner.

TABLE 1

$$D(V \| \hat{V}) = \sum_{i=1}^{m} \sum_{j=1}^{n} V_{ij} \ln\left(\frac{V_{ij}}{\hat{V}_{ij}}\right) - V_{ij} + \hat{V}_{ij}$$

Additionally, in one embodiment, to learn a speech dictionary, concatenate the clean speech may be concatenated from a stereo dataset into one long utterance and the spectrogram $V_{clean}$ may be created from this utterance. CNMF may then be used to decompose $V_{clean}$ into a spectro-temporal speech dictionary $W_{speech}$ and time activation matrix $H_{clean}$. Imposing sparsity on the time-activation matrix may improve the quality of the dictionary, so the generalized KL divergence may be augmented with an $L_1$ penalty on the time-activation matrix to encourage sparsity.

Table 2 illustrates an exemplary divergence augmentation. Of course, it should be noted that the exemplary divergence augmentation shown in Table 2 is set forth for illustrative purposes only, and thus should not be construed as limiting in any manner.

TABLE 2

$$C_{speech} = D(V_{clean} \| \hat{V}_{clean}) + \lambda \sum_{k=1}^{K} \sum_{j=1}^{n} H_{kj}^{clean},$$

where $\hat{V}_{clean} := \sum_{t=0}^{T-1} W_{speech}(t) \overset{t\rightarrow}{H}_{clean}$ and $\lambda$ controls the level of sparsity of H Table 3 illustrates exemplary multiplicative updates used to iteratively update $W_{speech}$ and $H_{clean}$. Of course, it should be noted that the exemplary updates shown in Table 3 are set forth for illustrative purposes only, and thus should not be construed as limiting in any manner.

TABLE 3

$$W_{speech}(t) \leftarrow W_{speech}(t) \otimes \frac{\frac{V_{clean}}{\hat{V}_{clean}} \overset{t\rightarrow}{H}{}_{clean}^{\top}}{1_{m \times n} \overset{t\rightarrow}{H}{}_{clean}^{\top}}, \forall\, t \in \{0, \ldots, T-1\}$$

$$H_{clean} \leftarrow H_{clean} \otimes \frac{\sum_{t=0}^{T-1} W_{speech}^{\top}(t) \left[\overset{\leftarrow t}{\frac{V_{clean}}{\hat{V}_{clean}}}\right]}{\sum_{t=0}^{T-1} (W_{speech}^{\top}(t) 1_{m \times n}) + \lambda},$$

where $\otimes$ element-wise multiplication and the division is element-wise.

Further, method 500 may proceed with operation 504, where a noise dictionary is learned. In one embodiment, CNMF may be used to learn the spectro-temporal properties of noise. For example, the noise dictionary may capture perturbations due to noise so that the time-activation matrix is unaffected by noise. That is, suppose we have clean speech $V_{clean}$ that decomposes into $W_{speech}$ and $H_{clean}$; and we have the corresponding speech corrupted by noise $V_{noisy}$. Then, we would like to find a noise dictionary $W_{noise}$ such that the CNMF decomposition of $V_{noisy}$ also yields the time-activation matrix $H_{clean}$. This may be achieved by minimizing a cost function.

Table 4 illustrates an exemplary cost function to be minimized. Of course, it should be noted that the exemplary cost function shown in Table 4 is set forth for illustrative purposes only, and thus should not be construed as limiting in any manner.

TABLE 4

$$C_{noisy} = D\left(V_{noisy} \,||\, \hat{V}_{noisy}\right) + \lambda \sum_{k=1}^{K} \sum_{j=1}^{n} H_{kj}^{clean},$$

where $\hat{V}_{noisy} := \sum_{t=0}^{T-1} (W_{speech}(t) + W_{moise}(t)) \overset{t\rightarrow}{H}_{clean}$ The idea behind the cost function may include trying to push the variability due to noise into $W_{noise}$. This formulation may utilize total variability modeling, where $W_{speech}$ represents the universal background model (UBM) and $W_{noise}$ represents the shift in the UBM due to some source of variability (in this case, noise).

To learn a noise dictionary, the clean and noisy utterances may be paired in the stereo dataset. The clean utterances and the noisy utterances may be concatenated and spectrograms may be created from these concatenated utterances $V_{clean}$ and $W_{noisy}$. With $V_{clean}$ and $W_{speech}$ fixed, the equation in Table 3 may be run to get $H_{clean}$. Then, with $V_{noisy}$, $W_{speech}$, and $H_{clean}$ fixed, the spectro-temporal noise dictionary $W_{noise}$ may be obtained by using an update rule that minimizes the equation in Table 4.

Table 5 illustrates an exemplary update rule used to minimize the equation in Table 4. Of course, it should be noted that the exemplary update rule shown in Table 5 is set forth for illustrative purposes only, and thus should not be construed as limiting in any manner.

TABLE 5

$$W_{noise}(t) \leftarrow W_{noise}(t) \otimes \frac{\frac{V_{noisy}}{\hat{V}_{noisy}} \overset{t\rightarrow}{H}{}_{clean}^{\top}}{1_{m\times n} \overset{t\rightarrow}{H}{}_{clean}^{\top}}, \forall\, t \in \{0, \ldots, T-1\}$$

Also, method 500 may proceed with operation 506, where a time-varying projection is learned. In one embodiment, once speech and noise dictionaries are developed, time-activation matrices may be generated for the entire dataset. However, note that the CNMF cost function minimizes the signal reconstruction error; that is, it will find the time-activation matrix $H_{utt}$ for each utterance $V_{utt}$ that minimizes the KL divergence between $V_{utt}$ and $\Sigma_{t=0}^{T-1}(W_{speech}(t)+W_{noise}(t))^{t}\vec{H}$.

This cost function may be appropriate the reconstructed signal (eg. denoised speech) is desired. In another embodiment, when using time-activation matrices as features, the reduction in mismatch between the matrices from clean and noisy speech is a goal. To reduce feature mismatch, a time-varying projection $P \in \mathbb{R}_{+}^{K\times m\times T}$ may be created that denoises the time-activation matrices from noisy speech by projecting them onto the space containing the time-activation matrices from clean speech.

Table 6 illustrates an exemplary cost function that achieves denoising. Of course, it should be noted that the exemplary cost function shown in Table 6 is set forth for illustrative purposes only, and thus should not be construed as limiting in any manner.

TABLE 6

$$C_{proj} = D\left(H_{clean} \,||\, \hat{H}_{denoised}\right) + D\left(H_{clean} \,||\, \hat{H}_{denoised}\right),$$

$$\text{where } \hat{H}_{clean} := \sum_{t=0}^{T-1} P(t) \overset{t\rightarrow}{\hat{V}}_{clean}, \; \hat{H}_{denoised} := \sum_{t=0}^{T-1} P(t) \overset{t\rightarrow}{\hat{V}}_{deniosed},$$

$$\text{and } \hat{V}_{denoised} := \sum_{t=0}^{T-1} W_{speech}(t) \overset{t\rightarrow}{\hat{H}}_{noisy}.$$

The first part of the cost function may minimize the divergence between the denoised and target clean time-activation matrices. The second part of the cost function may ensures that P projects time-activation matrices from clean and noisy speech in the same way. This may be useful during feature extraction where it may be unknown whether the utterance is clean or noisy.

Table 7 illustrates an exemplary minimization of the exemplary cost function in Table 6. Of course, it should be noted that the exemplary minimization shown in Table 7 is set forth for illustrative purposes only, and thus should not be construed as limiting in any manner.

TABLE 7

$$P(t) \leftarrow P(t) \otimes \frac{1 \overset{t\rightarrow}{\hat{V}}{}_{clean}^{\top} + \frac{H_{clean} + \hat{H}_{clean}}{\hat{H}_{denoised}} \overset{t\rightarrow}{\hat{V}}{}_{denoised}^{\top}}{\left(1 + \ln\left(\frac{\hat{H}_{clean}}{\hat{H}_{denoised}}\right)\right) \overset{t\rightarrow}{\hat{V}}{}_{clean}^{\top} + 2 \overset{t\rightarrow}{\hat{V}}{}_{denoised}^{\top}},$$

$$\forall\, t \in \{0, \ldots, T-1\}$$

To learn the time-varying projection, the clean and noisy utterances may be paired. For the clean utterances, CNMF may be run with $W_{speech}$ fixed to get $H_{clean}$. For the noisy utterances, we run CNMF with $W_{speech}$ and $W_{noise}$ fixed to get $H_{noisy}$. The time-varying projection may then be learned utilizing the equation in Table 7.

In addition, method 500 may proceed with operation 508, where acoustic features are extracted. In one embodiment, once the time-varying projection has been calculated, time-activation matrices may be generated for the entire dataset as features for the acoustic model. For each utterance $V_{utt}$ in the corpus, the time-activation matrix $H_{utt}$ may be identified with $W_{speech}$ and $W_{noise}$ fixed using an update rule.

Table 8 illustrates an exemplary update rule for finding a time activation matrix. Of course, it should be noted that the exemplary update rule shown in Table 8 is set forth for illustrative purposes only, and thus should not be construed as limiting in any manner.

TABLE 8

$$H_{utt} \leftarrow H_{utt} \otimes \frac{\sum_{t=0}^{T-1} (W_{speech}(t) + W_{noise}(t))^{\top} \left[ \frac{\overset{\leftarrow t}{V}_{utt}}{\hat{V}_{utt}} \right]}{\sum_{t=0}^{T-1} ((W_{speech}(t) + W_{noise}(t))^{\top} 1_{m \times n}) + \lambda},$$

where $\hat{V}_{utt} := \sum_{t=0}^{T-1} (W_{speech}(t) + W_{noise}(t)) \overset{t\rightarrow}{H}_{utt}$.

Then, the time-varying projection P may be used to calculate the denoised time activation matrix $H_{denoted} = \Sigma_{t=0}^{T-1} P(t)^{t} \vec{V}_{denoised}$, where $\vec{V}_{denoised} := \Sigma_{t=0}^{T-1} W_{speech}(t)^{t} \vec{H}_{utt}$. In one embodiment, log ($H_{denoised}$) may be input as features into the acoustic model.

Figure 6:
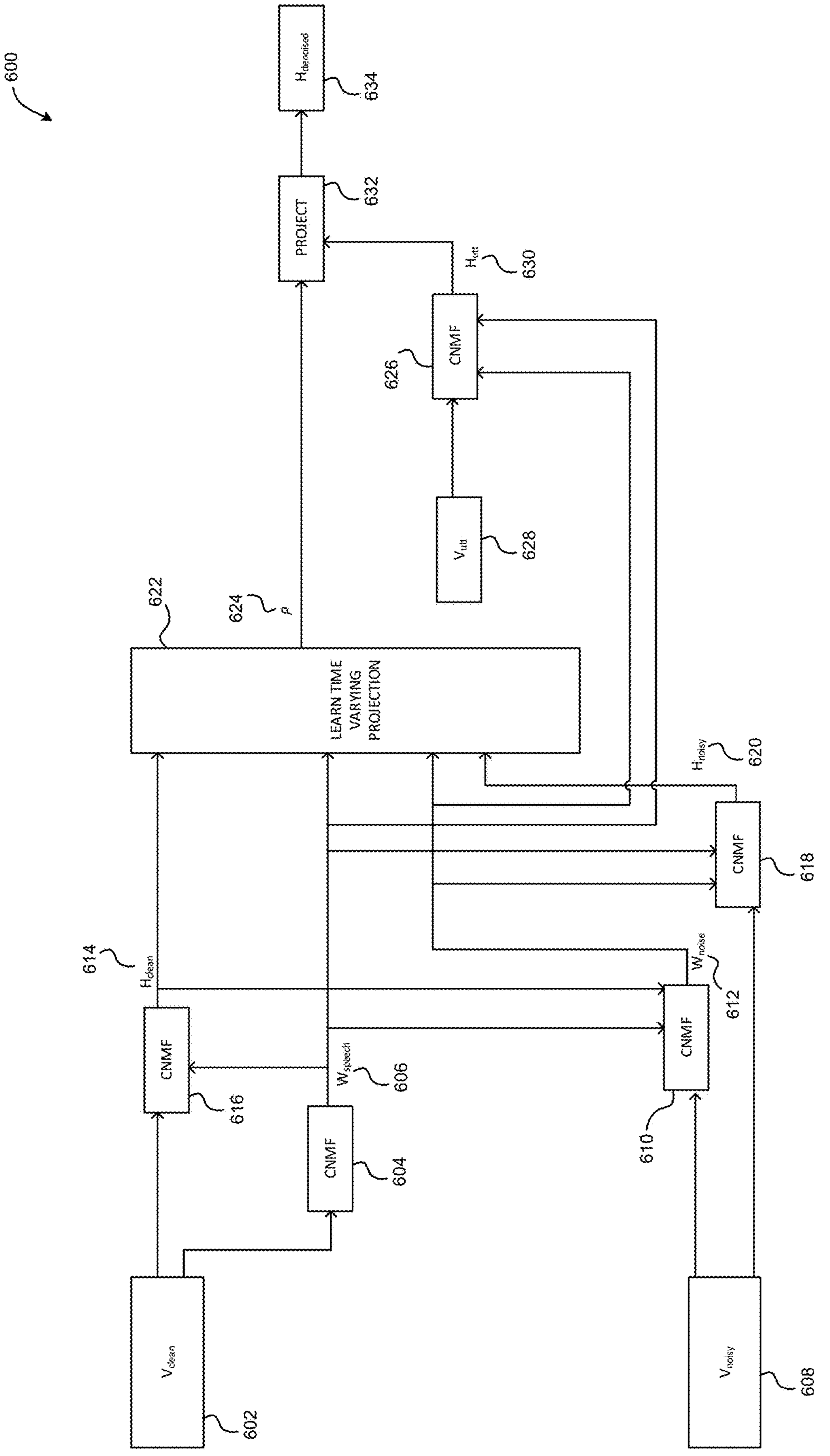
FIG. 6 illustrates a system for extracting acoustic features, in accordance with one embodiment.

Now referring to FIG. 6, system 600 for extracting acoustic features is shown according to one embodiment. The system 600 may be implemented in accordance with the present invention in any of the environments depicted in FIGS. 1-5, among others, in various embodiments.

One or more components of the system 600 may be performed by any suitable component of the operating environment. For example, in various embodiments, the system 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to implement the system 600. Illustrative processors include, but are not limited to, a central processing unit (CPU), an application specific integrated circuit (ASIC), a field programmable gate array (FPGA), etc., combinations thereof, or any other suitable computing device known in the art.

As shown, the system 600 includes an input clean speech signal 602 to which a first instance of a CNMF algorithm 604 is applied to produce a clean spectro-temporal speech dictionary 606. Additionally, the exemplary system 600 includes a second instance of a CNMF algorithm 610 which receives an input noisy speech signal 608, as well as a clean time activation matrix 614 produced by a third instance of a CNMF algorithm 616, and produces a noisy spectro-temporal speech dictionary 612.

Additionally, the system 600 includes a fourth instance of a CNMF algorithm 618 that receives the input noisy speech signal 608, the noisy spectro-temporal speech dictionary 612, and the clean spectro-temporal speech dictionary 606, and which produces a noisy time activation matrix 620. Further, the exemplary system 600 includes a time-varying projection module 622 that receives the noisy time activation matrix 620, the noisy spectro-temporal speech dictionary 612, the clean spectro-temporal speech dictionary 606, and the clean time activation matrix 614, and which produces the time-varying projection 624.

Further, the system 600 includes a fifth instance of a CNMF algorithm 626 that receives an unknown noisy speech signal 628, as well as the clean spectro-temporal speech dictionary 606 and the noisy spectro-temporal speech dictionary 612, and produces an unknown noisy time activation matrix 630. This unknown noisy time activation matrix 630 and the time-varying projection 624 are received by a denoising module 632 that produces a denoised time activation matrix 634 based on the unknown noisy speech signal 628.

In this way, noise-robust acoustic features may be created using convolutive non-negative matrix factorization (CNMF) without assuming any distribution on the noisy speech. For example, CNMF may create a dictionary that contains spectro-temporal building blocks of a signal and may generate a time-activation matrix that describes how to additively combine those building blocks to form the original signal. The time activation matrix may encode the occurrence and magnitude of each spectro-temporal building block within the speech. Thus, the time-activation matrix may be discriminative of the different phonemes at the frame level, when the dictionary remains fixed, while capturing the dynamics and time-trajectories of the speech building blocks. Dictionaries for speech and noise may be built such that the time-activation matrices are less affected by the presence of noise. These time-activation matrices may then be used as noise robust features for ASR.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:

creating a clean dictionary, utilizing a clean signal, including converting the clean signal into a plurality of clean spectro-temporal building blocks;

creating a noisy dictionary, utilizing a first noisy signal;

determining a time varying projection, utilizing the clean dictionary and the noisy dictionary; and denoising a second noisy signal, utilizing the time varying projection.

2. The computer-implemented method of claim 1, wherein creating the noisy dictionary includes creating a noisy spectrogram, converting the noisy spectrogram into a plurality of noisy spectro-temporal building blocks by applying a convolutive non-negative matrix factorization (CNMF) algorithm may to the noisy spectrogram, and adding the plurality of noisy spectro-temporal building blocks to the noisy dictionary.

3. The computer-implemented method of claim 1, wherein determining the time varying projection includes:

generating a time activation matrix for the clean signal, utilizing the clean dictionary;

generating a time activation matrix for the first noisy signal, utilizing the noisy dictionary; and comparing the time activation matrix for the clean signal and the time activation matrix for the first noisy signal to create the time varying projection.

4. The computer-implemented method of claim 1, further comprising expanding the clean dictionary and the noisy dictionary by updating the clean dictionary and the noisy dictionary to include new clean spectro-temporal building blocks and new noisy spectro-temporal building blocks created utilizing additional clean and noisy signals.

5. The computer-implemented method of claim 1, wherein creating the clean dictionary further includes creating a clean spectrogram that includes a visual representation of a spectrum of frequencies in the clean signal as they vary with time.

6. The computer-implemented method of claim 5, wherein converting the clean spectrogram into the plurality of clean spectro-temporal building blocks includes applying a convolutive non-negative matrix factorization (CNMF) algorithm to the clean spectrogram, where the CNMF identifies and creates the plurality of clean spectro-temporal building blocks within the clean spectrogram.

7. The computer-implemented method of claim 1, wherein creating the clean dictionary includes adding the plurality of clean spectro-temporal building blocks to the clean dictionary.

8. The computer-implemented method of claim 1, wherein denoising the second noisy signal includes creating a second noisy spectrogram, utilizing the second noisy signal.

9. The computer-implemented method of claim 8, wherein denoising the second noisy signal includes:

converting the second noisy spectrogram into a plurality of noisy spectro-temporal building blocks;

adding the plurality of noisy spectro-temporal building blocks to a second noisy dictionary;

generating a time activation matrix for the second noisy signal, utilizing the second noisy dictionary; and applying the time varying projection to the time activation matrix for the second noisy signal to obtain a denoised time activation matrix.

10. The computer-implemented method of claim 9, wherein the denoised time activation matrix is used to provide noise-robust acoustic features for automatic speech recognition (ASR).

11. The computer-implemented method of claim 10, wherein the denoised time activation matrix is used in combination with one or more acoustic features, selected from a group including but not limited to log-mel filterbank energies and mel-frequency cepstral coefficients (MFCCs), to provide noise-robust acoustic features for ASR.

* * * * *